Jan. 22, 1957  G. E. HENNING ET AL  2,778,059
METHODS OF AND APPARATUS FOR MAKING
INSULATED MULTICONDUCTOR WIRE
Original Filed Feb. 3, 1954                       2 Sheets-Sheet 1

INVENTORS
G. E. HENNING
A. S. WINDELER
BY
ATTORNEY

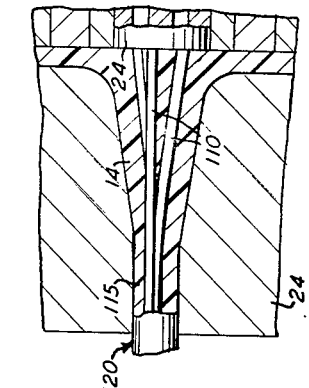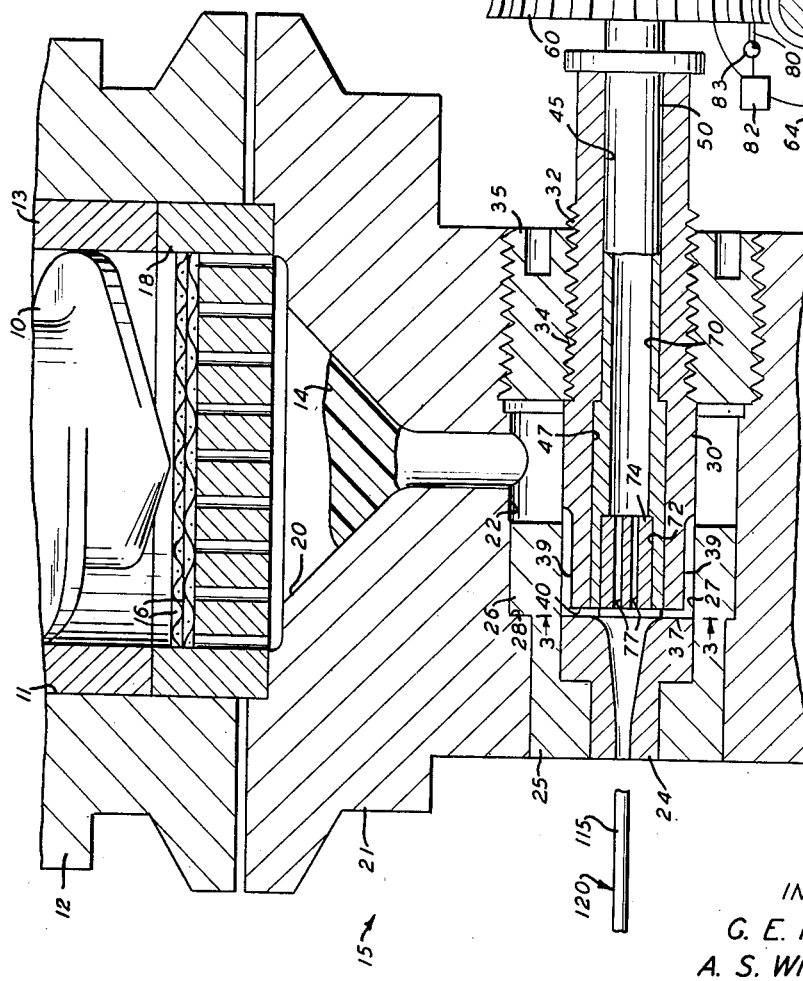

2,778,059

METHODS OF AND APPARATUS FOR MAKING INSULATED MULTICONDUCTOR WIRE

George E. Henning, Baltimore, and Alfred S. Windeler, Towson, Md., assignors to Western Electric Company, Incorporated, New York, N. Y., a corporation of New York, and Bell Telephone Laboratories, Incorporated, New York, N. Y., a corporation of New York Original application February 3, 1954, Serial No. 407,872. Divided and this application February 3, 1955, Serial No. 485,848

7 Claims. (Cl. 18—13)

This invention relates to methods of and apparatus for making insulated multiconductor wire.

This application is a division of our copending application Serial No. 407,872, filed February 3, 1954.

In the production of multiconductor wires by extruding a common insulating covering of an insulating compound on a plurality of spaced conductors, serious difficulties have been encountered in maintaining uniform the thickness of insulation between the individual conductors and also between the conductors and the outer periphery of the insulating covering. One of the principal causes of nonuniformity in insulation thickness is the inadvertent presence of unbalanced plastic flow conditions in the extruding head of an extruder employed to form the insulating covering. This problem is especially acute when the extruder employed is of the cross-head type having a transverse extruding head. This is due to the fact that in this type of extruding apparatus there is an abrupt change in the direction of flow of the insulating compound as it is forced into an extrusion passage in the extruding head.

In a typical cross-head type extruder which is provided with a transverse extruding head, the extrudable plastic material is forced by a stock screw into the extrusion passage in the head. Because of the 90° bend in the flow path of the insulating compound, the length of the path traversed by the compound flowing through that portion of the cross section of the extrusion passage closest to the stock screw is substantially shorter than that traversed by the compound flowing through the opposite portion thereof, which is furtherest from the stock screw. Also the flow of the compound through the portion of the cross section of the passage closest to the stock screw approximates that of a fluid bounded by a single plate, whereas in the other portion of the cross section furtherest from the stock screw, the flow approximates that of a fluid passing between two parallel plates. Hence, the friction losses in the portion nearest to the stock screw are appreciably lower than elsewhere in the passage.

As a result of the difference in the lengths of the paths traversed by the insulating compound in various portions of the extrusion passage and the characteristics of their associated flows, there exists a substantial difference in the pressure heads at the critical point where the compound initially envelops the conductors in an extrusion die positioned at the exit end of the extrusion passage. This unbalance of pressure heads and resultant unbalance of plastic flow conditions throughout the cross section of the extrusion passage at the critical point of extrusion causes eccentricity of the covering extruded on the conductors, the thinnest portion of the covering occurring in that part of the insulation produced in the portion of the passage cross section furtherest from the stock screw (i. e. where the lowest pressure head exists).

Various schemes have been developed for eliminating these unbalanced plastic flow conditions in the extruding head. However, while some of these schemes have been particularly successful, none of them have succeeded in completely eliminating the unbalanced flow condition. Thus, in practical applications it has been found that there exists a certain amount of nonuniformity in the thickness of insulation between the individual conductors and the outer periphery of the insulating covering. This nonuniformity becomes a serious problem when the multiconductor wire so produced is designed for use in high frequency communication systems because of the resultant electrical unbalance therein.

It is an object of this invention to provide new and improved methods of and apparatus for making insulated multiconductor wires.

A method illustrating certain features of the invention may include the steps of advancing a plurality of conductors in spaced relationship, transposing the spaced conductors rotatably as they are thus advanced, and simultaneously applying a common covering of insulating material over the advancing conductors.

Apparatus illustrating certain features of the invention may include an extrusion head having an extrusion passage formed therein, and a forming die mounted at the exit end of the extrusion passage. A member is mounted for rotation about the longitudinal axis of the forming die and is provided with a plurality of longitudinal passages through which a plurality of conductors may be advanced simultaneously into and through the forming die. Means are provided for turning the member to transpose the advancing conductors rotatably.

A complete understanding of the invention may be had from the following detailed description of methods of and apparatus for forming specific embodiments thereof, when read in conjunction with the appended drawings, in which:

Fig. 2 is a fragmentary, horizontal section of the apparatus taken along the longitudinal axis thereof, with parts thereof broken away for clarity;

Fig. 5 is an enlarged, fragmentary view of a portion of the apparatus shown in Fig. 2.

Figure 1:
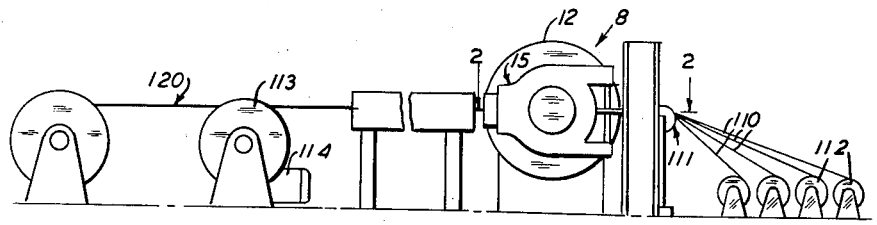
Fig. 1 is a schematic diagram of an apparatus for manufacturing insulated multiconductor wires.

Referring now in detail to the drawings, there is shown in Figs. 1 and 2 an extruder 8 of the L-head type. As shown in Fig. 2, the extruder 8 includes a stock screw 10 disposed longitudinally for rotation within a cylindrical bore 11 of an extrusion cylinder 12 having a liner 13. Means (not shown) are provided for rotating the stock screw to knead and advance a plastic insulating compound 14 toward a delivery end of the extrusion bore 11, where an extrusion head 15 is secured.

Mounted transversely across the delivery end of the extrusion bore 11 is a straining screen 16 supported upon a backing plate 18. After passing through the straining screen 16 and the backing plate 18, the plastic compound 14 enters a tapered passageway 20 formed in a cylindrical, centrally apertured block 21. The entrance portion of the passageway 20 diminishes gradually in cross section as it leads from the extrusion bore 11 to a passage 22 formed internally of the block 21. The longitudinal axis of the passage 22 is disposed transversely with respect to the longitudinal axes of the bore 11 and the passageway 20.

At the left-hand end of the passage 22, as seen in Fig. 2, is an extrusion die 24 mounted concentrically within an apertured retaining bushing 25 having an external shoulder portion 26 and a counterbore 27. The bushing 25 is mounted fixedly within the left-hand end of the passage 22 against a complementary shouldered portion 28 formed in the passage.

Mounted concentrically within the passage 22 is a core tube holder 30 which is provided intermediate of the ends with an externally threaded portion 32. The threaded portion 32 of the core tube holder 30 is received within an internally threaded axial bore 34 in an adapter plug 35. The plug 35 is provided additionally with external threads which permit the plug to be secured threadedly within the extrusion head 15. As a result of this mounting arrangement, the core tube holder 30 is adjustable axially within the passage 22.

Figures 3, 4:
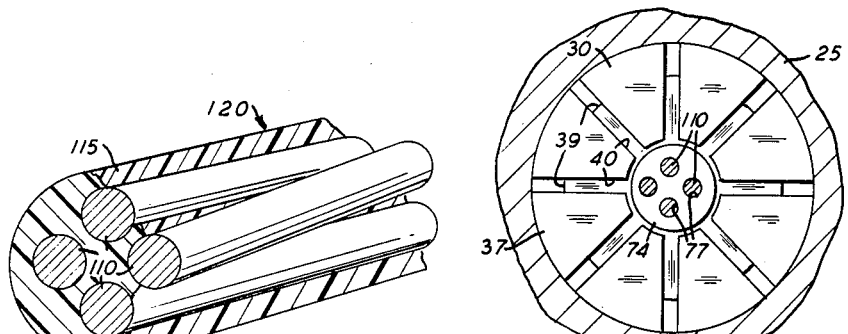
Fig. 3 is an enlarged, vertical section taken along line 3—3 of Fig. 2.
Fig. 4 is an enlarged, fragmentary, perspective view of a portion of a finished multiconductor wire, with parts thereof broken away for clarity.

As shown in Fig. 2, the left-hand end of the core tube holder 30, in its normal position, extends into the counterbore 27 formed in the bushing 25. A transversely flat face 37 provided on the left-hand end of the core tube holder 30 abuts the die 24. This end of the core tube holder 30 is provided additionally on its external surface with a plurality of longitudinal grooves 39—39 which are spaced equally about its periphery. The longitudinal grooves 39—39 lead to a plurality of radial grooves 40—40 formed in the face 37 (Fig. 3). Thus, the left-hand end of the core tube holder 30 occupies all of the remaining portion of the counterbore 27 adjacent to the die 24, except for the space provided by the longitudinal grooves 39—39 and the radial grooves 40—40. As shown in Fig. 2, the longitudinal grooves 39—39 extend along the periphery of the core tube holder 30 from the left-hand end thereof to a point in communication with the unoccupied portion of the passage 22 between the adapter plug 35 and the bushing 25.

The core tube holder 30 is provided with an axial, cylindrical bore 45 which is provided with a counterbore 47 at the left-hand end thereof. Mounted rotatably within the bore 45 and counterbore 47 in the core tube holder 30, is a core tube 50, the external surfaces of which are complementary to the bore and counterbore, so as to fit closely therewithin with a minimum of clearance provided to permit rotation of the core tube with respect to the core tube holder. The right-hand end of the core tube holder 30 extends beyond the right-hand face of the adapter plug 35 and protrudes a substantial distance from the extrusion head 15.

The right-hand end of the core tube 50 extends beyond the corresponding end of the core tube holder 30, and is provided at its extremity with a worm wheel 60 keyed thereupon for rotation therewith. The worm wheel 60 is in meshing engagement with a worm 62 which is mounted on the shaft 63 of a reversible electric motor 64. Energization of the motor 64 causes rotation of the worm 62, which rotation is transmitted to the core tube 50 through the worm wheel 60.

As shown in Fig. 2, the core tube 50 is provided with an axial bore 70 which extends the entire length thereof and is provided with a counterbore 72 at the left-hand end thereof. The counterbore 72 in the core tube 50 is designed to receive a cylindrical insert 74 which when positioned in the counterbore fits tightly therewithin and is held fixedly to the core tube for rotation therewith by means of a pin (not shown). The insert 74 is provided with four parallel, longitudinally extending bores 77—77 spaced equally about the axis thereof, as shown in Fig. 3. The left-hand end faces of the core tube 50 and the insert 74 are recessed slightly with respect to the face 37 of the core tube holder 30.

The worm wheel 60 is provided with a lug 80 attached to the left-hand face thereof at a point near its periphery. As the worm wheel 60 is rotated by the worm 62, the lug 80 travels in a circular path. Positioned adjacent to the path traveled by the lug 80 is a switch 82 having a snap-action type actuator 83 placed so as to be contacted by the lug 80 each time the lug moves past the switch 82. The actuator 83 is movable from side to side and when displaced sufficiently to one side it will snap into a more advanced position at that side.

Figure 6:
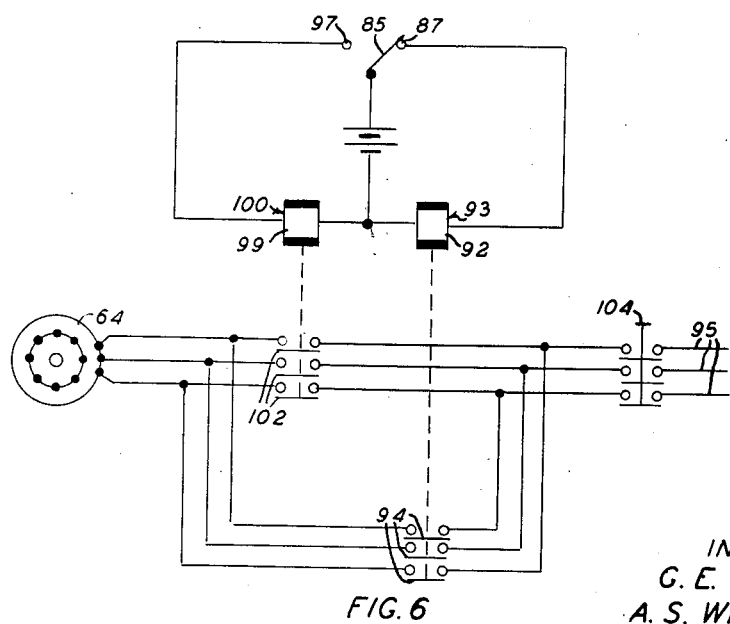
Fig. 6 is a schematic diagram of an electrical control circuit associated with the apparatus.

Referring now to Fig. 6, which is a schematic diagram of a circuit for controlling the operation of the electric motor 64, when the actuator 83 moves to the right with a snap-action it causes a contactor 85 to engage a contact 87. When the contactor 85 engages the contact 87, a solenoid 92 of a solenoid-operated relay 93 is energized to close its associated contacts 94—94 and thereby to connect the motor to three-phase supply lines 95—95 which energize the motor 64 to rotate the shaft 63 in one direction.

The contactor 85 will remain in engagement with the contact 87 until the actuator 83 is moved sufficiently to the opposite side by the lug 80 to cause it to snap into a position wherein the contactor 85 engages a contact 97. Before the contactor 85 engages the contact 97, it disengages the contact 87 to break the circuit including the contact 87 and the solenoid 92, causing the contacts 94—94 to drop out and deenergize the motor. Then when the contactor 85 engages the contact 97, a circuit including a solenoid 99 of a solenoid-operated relay 100 is completed to close its associated contacts 102—102. The closing of contacts 102—102 energizes the motor 64 from supply lines 95—95 to drive the motor in a reverse direction. A manually operated switch 104 is provided in the lines 95—95 for energizing and deenergizing the circuit.

Operation

Preparatory to an extruding operation, four individual, initially uninsulated, filamentary conductors 110—110 of copper wire, or the like, are passed through the axial bore 70 in the core tube 50, which is in axial alignment with the central orifice in the die 24. The conductors 110—110 are threaded individually through the bores 77—77 in the insert 74, one conductor being positioned in each of the four bores so that the conductors passing from the core tube 50 into the orifice of the die 24 are disposed in an equilateral arrangement, as shown in Fig. 3.

In operation, the conductors 110—110 are advanced continuously through the core tube 50 over a rotatable sheave 111 from individual supplies 112—112 by means of a suitable capstan 113 driven by a motor 114. The plastic compound 14 is worked and advanced continuously by the stock screw 10 through the passageway 20 into the passage 22. Upon entering the passage 22, the flow of the plastic compound 14 is split up into a plurality of small streams which flow through the longitudinal grooves 39—39, and thence through the radial grooves 40—40. The plastic compound 14 flowing through the radial grooves 40—40 converges upon and envelops completely the four individual, equilaterally spaced conductors 110—110 as they exit from the bores 77—77 in the insert 74. The plastic compound 14 forms a unitary conical stream as it enters the orifice of the die 24 and when the conductors 110—110 emerge from the exit end of the die, they are enveloped in a solidified, common sheath 115 of insulating compound to form a multiconductor wire 120 (Fig. 4).

Although every effort is made to design and construct an extruding head in which there is a minimum of plastic flow unbalance, as a practical consideration, some unbalanced conditions always exist. Thus, it may be assumed that at the critical point of extrusion, where the plastic compound 14 initially envelops the conductors 110—110, there exists a substantial difference in the pressure heads of the flowing compound at different points throughout a cross section of the passage 22.

As the conductors 110—110 advance continuously through the bores 77—77 in the insert 74, the core tube 50 and the insert are continuously oscillated rotatably through 360° about their longitudinal axis, the period of oscillation being determined by the speed of the motor 64. The motor 64 rotates the core tube 50 and the insert 74 in one direction through an angle of 360°, whereupon the lug 80 engages and operates the actuator 83 to cause a reversal of the motor to rotate the core tube and insert in the opposite direction through 360°, whereupon the motor is again reversed in a like manner.

The above-described oscillatory, rotational movement of the core tube 50 and the insert 74 has the effect of spirally transposing the conductors 110—110 with respect to the conical stream of plastic compound 14 entering the orifice in the die 24 and enveloping the conductors, while the conductors remain in the same positions with respect to each other. As a result, each of the conductors 110—110 spirals about the longitudinal axis of the insert 74. For example, assuming that the linear speed of the conductors 110—110 is 150 feet per minute and that the speed of the motor 64 is such that it oscillates the core tube 50 fifty times per minute, each convolution formed by the conductors will be three feet in length.

In the finished multiconductor wire 120, the conductors 110—110 are first spiraled in one direction through 360° and then are spiraled in the reverse direction through 360°, whereupon the cycle is repeated. Assuming that unbalanced plastic flow conditions exist at the critical point of extrusion, each of the conductors 110—110 will continuously move through positions wherein it is covered alternately by a maximum and a minimum thickness of insulation, separating it from the outer periphery of the sheath 115. Due to this transposition of the conductors 110—110, one conductor will not always be in the position wherein the thickness of the insulation surrounding it is either a maximum or a minimum. Instead the differences in the thicknesses of the insulation surrounding individual conductors 110—110 will be averaged out over a long length of the multiconductor wire 120 and there will be a minimum of electrical unbalance inherent in such wire. Without the aforementioned transposition of the conductors the asymmetry caused by unbalanced plastic flow conditions would be systematic and even though it may be small it could build up to cause a sizable electrical unbalance in a cable length.

The term "plastic insulating compound," as employed in this specification and the following claims, will be understood to include both thermoplastic insulating compounds, such as polyethylene, or the like, and thermosetting insulating compounds, such as Neoprene compounds and other rubbery elastomers, or the like.

It will be understood that various modifications of the invention may be made within the spirit and scope thereof.

What is claimed is:

1. The method of manufacturing insulated, multiconductor wires, which comprises simultaneously advancing a plurality of conductors in spaced relationship, oscillating the spaced conductors rotatably as they are thus advanced, and simultaneously applying a common covering of insulating material over the advancing spaced, oscillating conductors, whereby variations in the covering of insulating material are uniformly distributed along the length of the resulting composite product.

2. The method of manufacturing insulated, multiconductor wires, which comprises simultaneously advancing a plurality of spaced conductors, applying a common extruded covering of insulating material over the conductors, and simultaneously oscillating the conductors rotatably through a large angle, whereby variations in the thickness of the insulation applied over individual conductors and in the spacing of the conductors are distributed over the length of the resulting composite product.

3. The method of manufacturing insulated, multiconductor wires, which comprises simultaneously advancing a plurality of spaced conductors, applying a common extruded covering of insulating material over the conductors, and simultaneously oscillating the conductors rotatably through an angle of substantially 360°, whereby variations in the thickness of the insulation applied over individual conductors and in the spacing of the conductors are distributed over the length of the resulting composite product.

4. Apparatus for applying an extruded covering of a plastic material upon a plurality of spaced conductors to form a composite, insulated, multiconductor wire, which comprises an extrusion head having a longitudinally extending extrusion passage formed therein, a forming die mounted at the exit end of the extrusion passage, a member mounted for rotation about the longitudinal axis of the forming die and provided with a plurality of longitudinal guide passages through which a plurality of conductors may be advanced simultaneously into and through the forming die, and means for oscillating the member rotatably to transpose the advancing conductors.

5. In apparatus for applying a covering of plastic material upon a plurality of spaced conductors to form a composite multiconductor wire, including a cross-head type extruder having an extruding head with an extrusion passage formed therein and a forming die mounted within the exit end of the passage, the improvement which comprises a stationary core tube holder mounted in the extrusion passage and provided with an axial bore, a core tube mounted rotatably within the axial bore of the core tube holder and provided with a plurality of passages through which a plurality of conductors may be simultaneously advanced into and through the die, and means operatively connected to the core tube for oscillating said core tube rotatably.

6. In apparatus for applying a covering of plastic material upon a plurality of spaced conductors to form a composite multiconductor wire, including a cross-head type extruder having an extruding head with an extrusion passage formed therein and a forming die mounted within the exit end of the passage, the improvement which comprises a stationary core tube holder mounted in the extrusion passage and provided with an axial bore, a core tube mounted rotatably within the axial bore of the core tube holder and provided with a plurality of passages through which a plurality of conductors may be simultaneously advanced into and through the die, and a reversible electric motor operatively connected to the core tube for oscillating said core tube rotatably through a rotational angle of substantially 360°.

7. In apparatus for applying a covering of plastic material upon a plurality of spaced conductors to form a composite multiconductor wire, including a cross-head type extruder having an extruding head with an extrusion passage formed therein and a forming die mounted within the exit end of the passage, the improvement which comprises a stationary core tube holder mounted in the extrusion passage and provided with an axial bore, a core tube mounted rotatably within the axial bore of the core tube holder and provided with a plurality of spaced longitudinal passages, means for advancing a plurality of conductors simultaneously at a predetermined speed through corresponding passages in the core tube and into and through the die, and means operatively connected to the core tube for oscillating said core tube rotatably at a predetermined rate through a rotational angle of substantially 360°.

References Cited in the file of this patent

UNITED STATES PATENTS

| | | |
|---|---|---|
| 1,797,249 | Truesdale et al. | Mar. 24, 1931 |
| 1,984,038 | Shaw et al. | Dec. 11, 1934 |
| 2,446,057 | Morin | July 27, 1948 |